US012082165B2

(12) United States Patent
Li et al.

(10) Patent No.: US 12,082,165 B2
(45) Date of Patent: Sep. 3, 2024

(54) GUARD SYMBOLS (NG) SIGNALING FOR CO-LOCATED INTEGRATED ACCESS BACKHAUL (IAB) DISTRIBUTED UNIT (DU)/MOBILE TERMINATION (MT) RESOURCE TRANSITION

(71) Applicant: Intel Corporation, Santa Clara, CA (US)

(72) Inventors: Qian Li, Beaverton, OR (US); Lili Wei, Portland, OR (US); Geng Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 17/090,605

(22) Filed: Nov. 5, 2020

(65) Prior Publication Data

US 2021/0144705 A1 May 13, 2021

Related U.S. Application Data

(60) Provisional application No. 62/932,195, filed on Nov. 7, 2019, provisional application No. 62/932,183, filed on Nov. 7, 2019.

(51) Int. Cl.
*H04W 72/044* (2023.01)
*H04L 27/26* (2006.01)
*H04W 72/0446* (2023.01)

(52) U.S. Cl.
CPC ..... *H04W 72/0446* (2013.01); *H04L 27/2607* (2013.01)

(58) Field of Classification Search
CPC .......... H04W 72/0446; H04W 28/0215; H04L 27/2607
See application file for complete search history.

(56) References Cited

U.S. PATENT DOCUMENTS

| 11,516,063 | B2 * | 11/2022 | You | H04L 5/0048 |
|---|---|---|---|---|
| 2020/0248399 | A1 * | 8/2020 | Ohara | D06M 15/277 |
| 2021/0105782 | A1 * | 4/2021 | Marcone | H04W 88/14 |
| 2022/0086884 | A1 * | 3/2022 | Ronkainen | H04W 28/16 |
| 2022/0131729 | A1 * | 4/2022 | You | H04L 5/0007 |
| 2022/0131733 | A1 * | 4/2022 | You | H04W 88/04 |

(Continued)

OTHER PUBLICATIONS

"3GPP TS38.331 V15.3.0", NR; RRC protocol specification, (Oct. 2018), 441 pgs.

(Continued)

*Primary Examiner* — Mounir Moutaouakil
(74) *Attorney, Agent, or Firm* — Schwegman Lundberg & Woessner, P.A.

(57) ABSTRACT

To configure an IAB node for DU function and MT function resource transition within an IAB network, the processing circuitry is to decode configuration signaling from a DU function of an IAB parent node, which provides allocated resources for a parent backhaul link. A resource transition is detected in adjacent slots between transmission or reception of data on the parent backhaul link and a child link. A number of desired guard symbols is determined for insertion during the transmission or reception of the data to avoid overlapping of the allocated resources for the parent backhaul link and allocated resources for the DU function during the resource transition in the adjacent slots.

18 Claims, 10 Drawing Sheets

(56) References Cited

U.S. PATENT DOCUMENTS

2022/0141074 A1* 5/2022 You ................... H04L 27/2646
 375/262
2022/0182160 A1* 6/2022 Su ....................... H04B 17/309
2022/0182917 A1* 6/2022 Muhammad ............ H04L 45/42

OTHER PUBLICATIONS

"3GPP TS38.473 V15.10.0", 3rd Generation Partnership Project;Technical Specification Group Radio Access Network; NG-RAN;F1 application protocol (F1AP)(Release 15), (Jul. 2020), 7 pgs.

"3GPP TS 38.321 V15.9.0", 3rd Generation Partnership Project;Technical Specification Group Radio Access Network;NR;Medium Access Control (MAC) protocol specification(Release 15), (Jul. 24, 2020), 78 pgs.

* cited by examiner

GUARD SYMBOLS (NG) SIGNALING FOR CO-LOCATED INTEGRATED ACCESS BACKHAUL (IAB) DISTRIBUTED UNIT (DU)/MOBILE TERMINATION (MT) RESOURCE TRANSITION

PRIORITY CLAIM

This application claims the benefit of priority under 35 U.S.C. 119(e) to the following applications:

U.S. Provisional Patent Application Ser. No. 62/932,195, filed Nov. 7, 2019, and entitled "SIGNALING REGARDING GUARD SYMBOLS FOR CO-LOCATED INTEGRATED ACCESS BACKHAUL (IAB) DISTRIBUTED UNIT (DU)/MOBILE TERMINATION (MT) RESOURCE TRANSITION;" and U.S. Provisional Patent Application Ser. No. 62/932,183, filed Nov. 7, 2019, and entitled "SIGNALING ENHANCEMENTS FOR PER-DISTRIBUTED UNIT (DU) AND PER-LINK RESOURCE CONFIGURATION OF AN INTEGRATED ACCESS BACKHAUL (IAB) DU."

Each of the United States Provisional patent applications listed above is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for signaling associated with guard symbols (Ng) for co-located integrated access and backhaul (IAB) distributed unit (DU)/mobile termination (MT) resource transition.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety 35 of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for signaling associated with guard symbols (Ng) for co-located IAB DU/MT resource transition.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
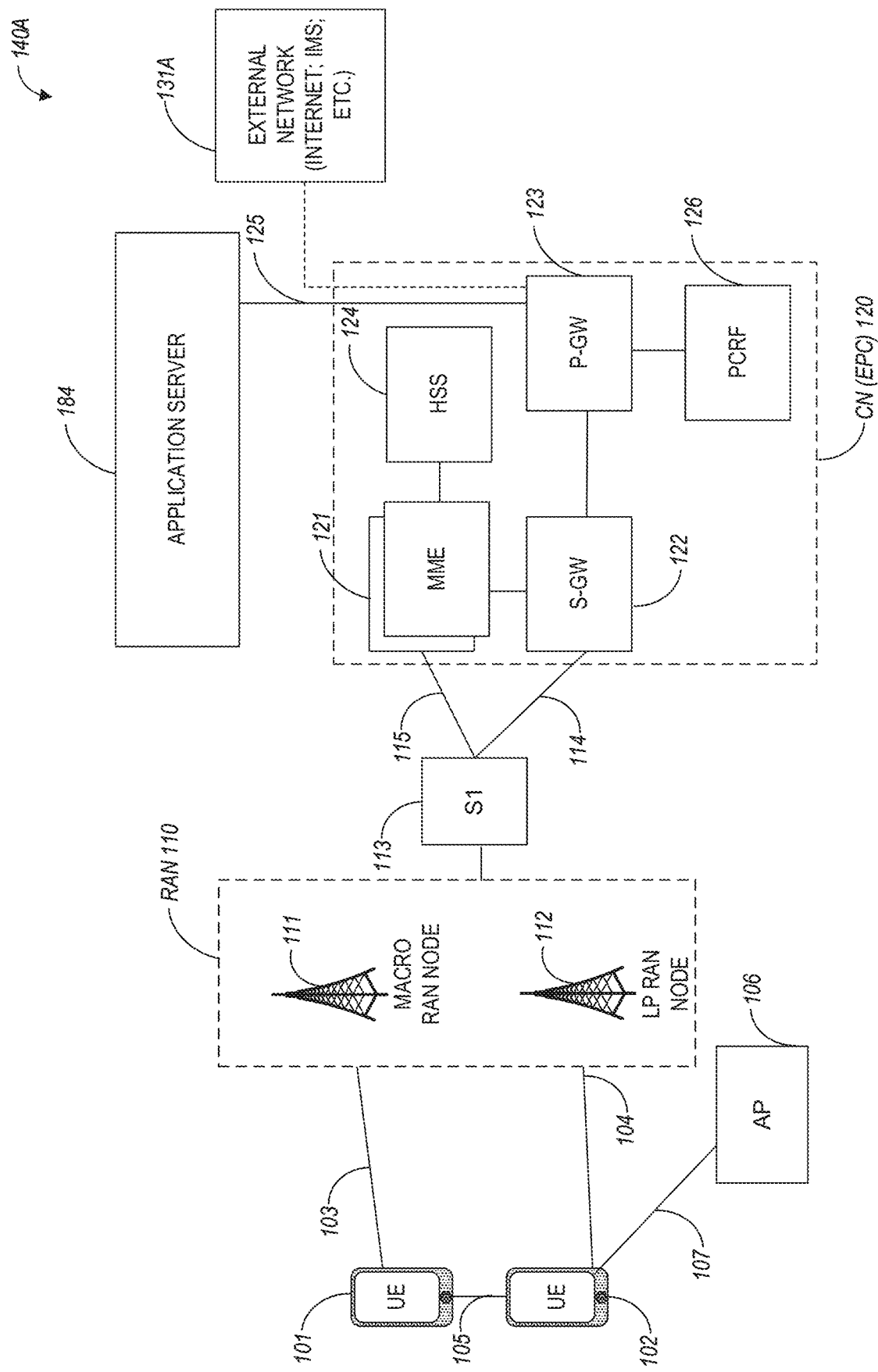
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an SI interface 113. In aspects, the CN 120 may be an evolved packet core (EPC) network, a NextGen Packet Core (NPC) network, or some other type of CN (e.g., as illustrated in reference to FIGS. 1B-IC). In this aspect, the S1 interface 113 is split into two parts: the S1-U interface 114, which carries traffic data between the RAN nodes 111 and 112 and the serving gateway (S-GW) 122, and the SI-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, the capacity of the equipment, the organization of the network, etc. For example, the HSS 124 can provide support for routing/roaming, authentication, authorization, naming/addressing resolution, location dependencies, etc.

The S-GW 122 may terminate the SI interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, December 2018). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
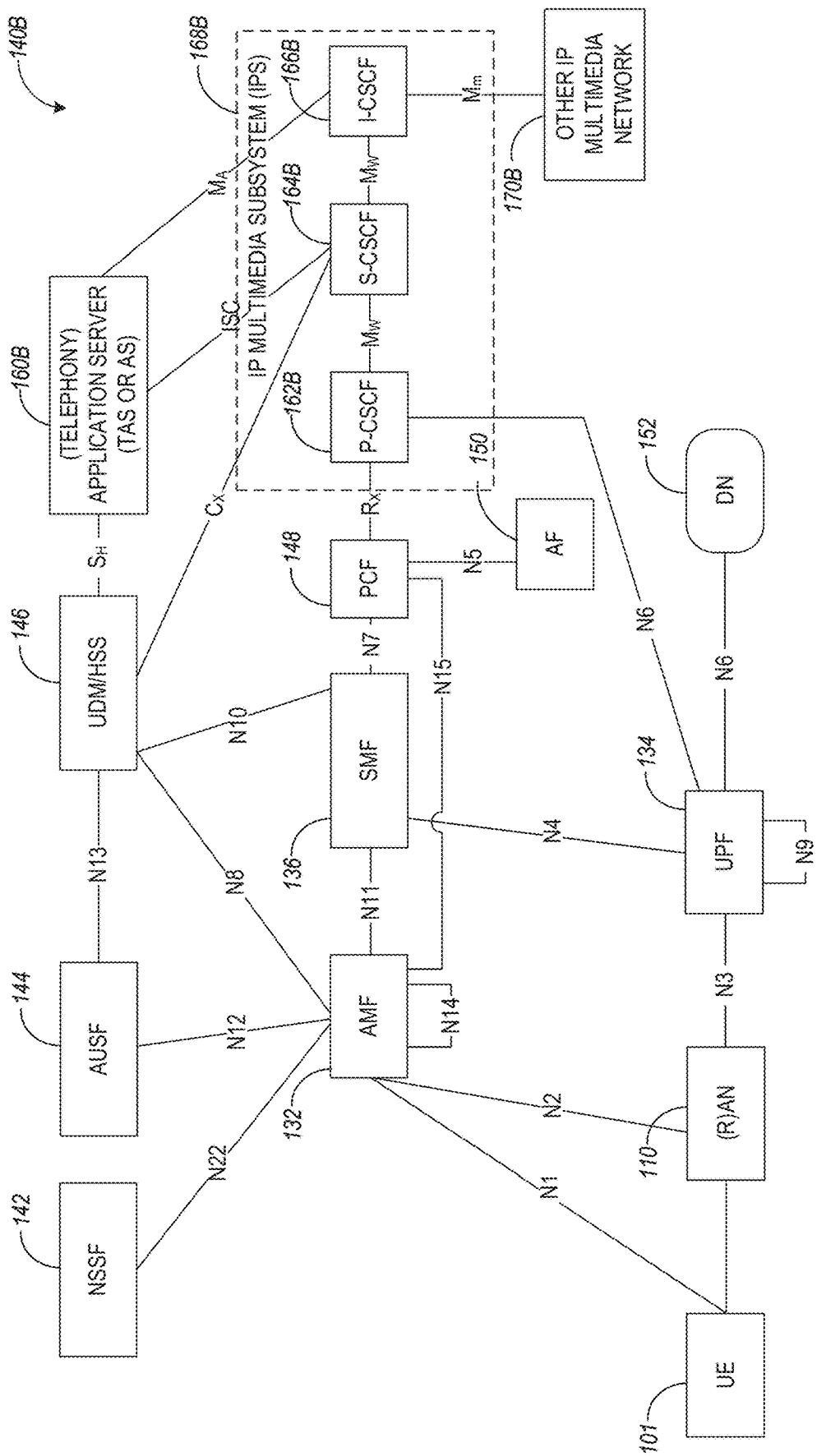
FIG. 1B and FIG. 1C illustrate a non-roaming 5G system architecture in accordance with some aspects.

FIG. 1B illustrates a non-roaming 5G system architecture in accordance with some aspects. Referring to FIG. B, there is illustrated a 5G system architecture 140B in a reference point representation. More specifically. UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown). N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
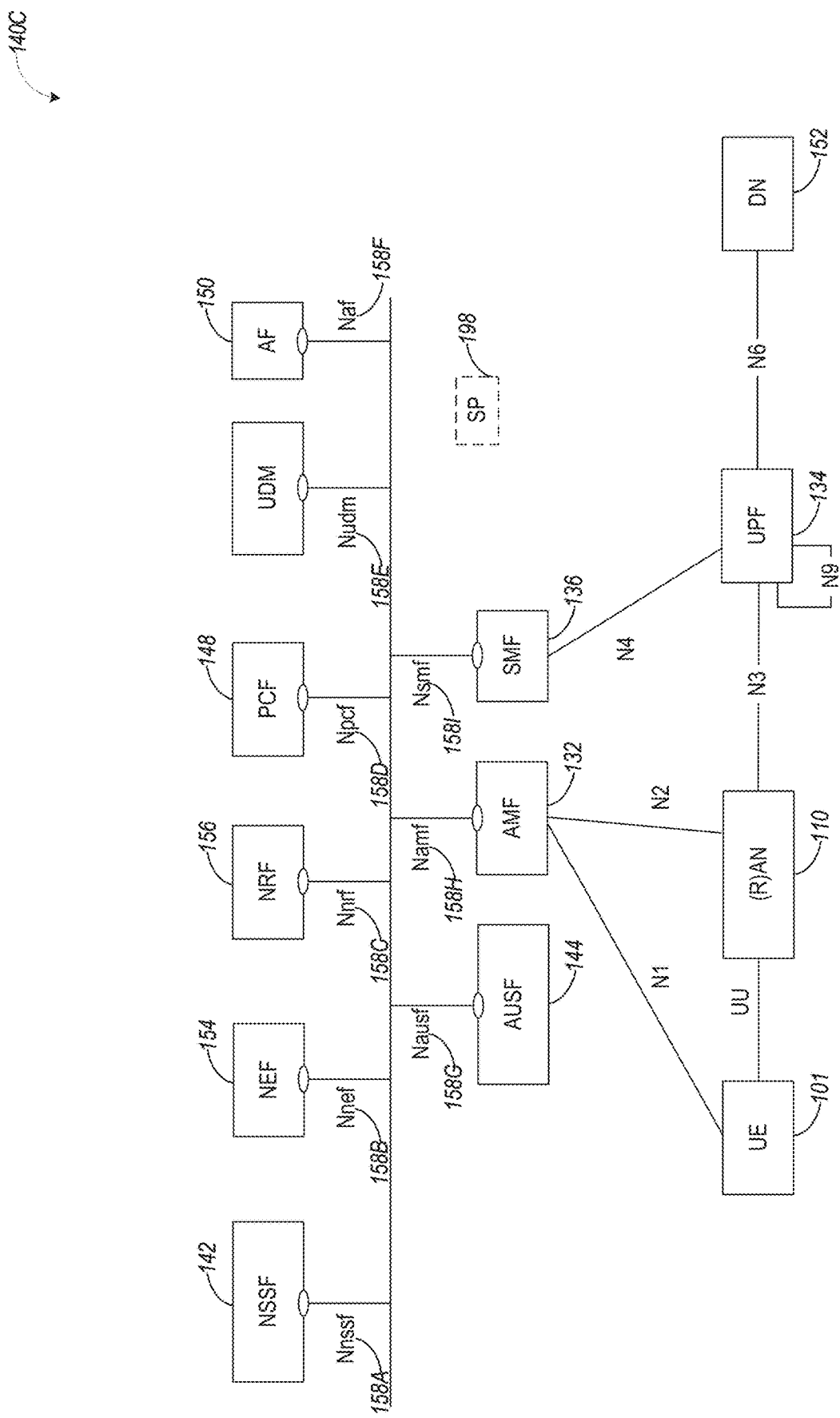

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE, a base station (e.g., any of the UEs or base stations discussed in connection with FIG. 1A-FIG. 1C), or any of the nodes in the Integrated Access and Backhaul (AB) communication systems discussed in connection with FIGS. 2-8.

For an IAB node, the IAB distributed unit (DU) function may operate with multiple cells by using multiple component carriers (CCs) and/or multiple antenna panels. On the other hand, the co-located AB mobile termination (MT) function can work under different CCs with carrier aggregation for a backhaul link. In some aspects, the IAB donor node central unit (CU) function and the parent node can be aware of the multiplexing capability between the MT and the DU functions (e.g., time-division multiplexing (TDM) is required or TDM is not required) of an IAB node for any {MT CC, DU cell} pair. Techniques discussed herein use signaling contents, signaling mechanisms, and detailed signaling methods to communicate an IAB node's multiplexing capability to the donor CU and the parent node.

Figure 2:
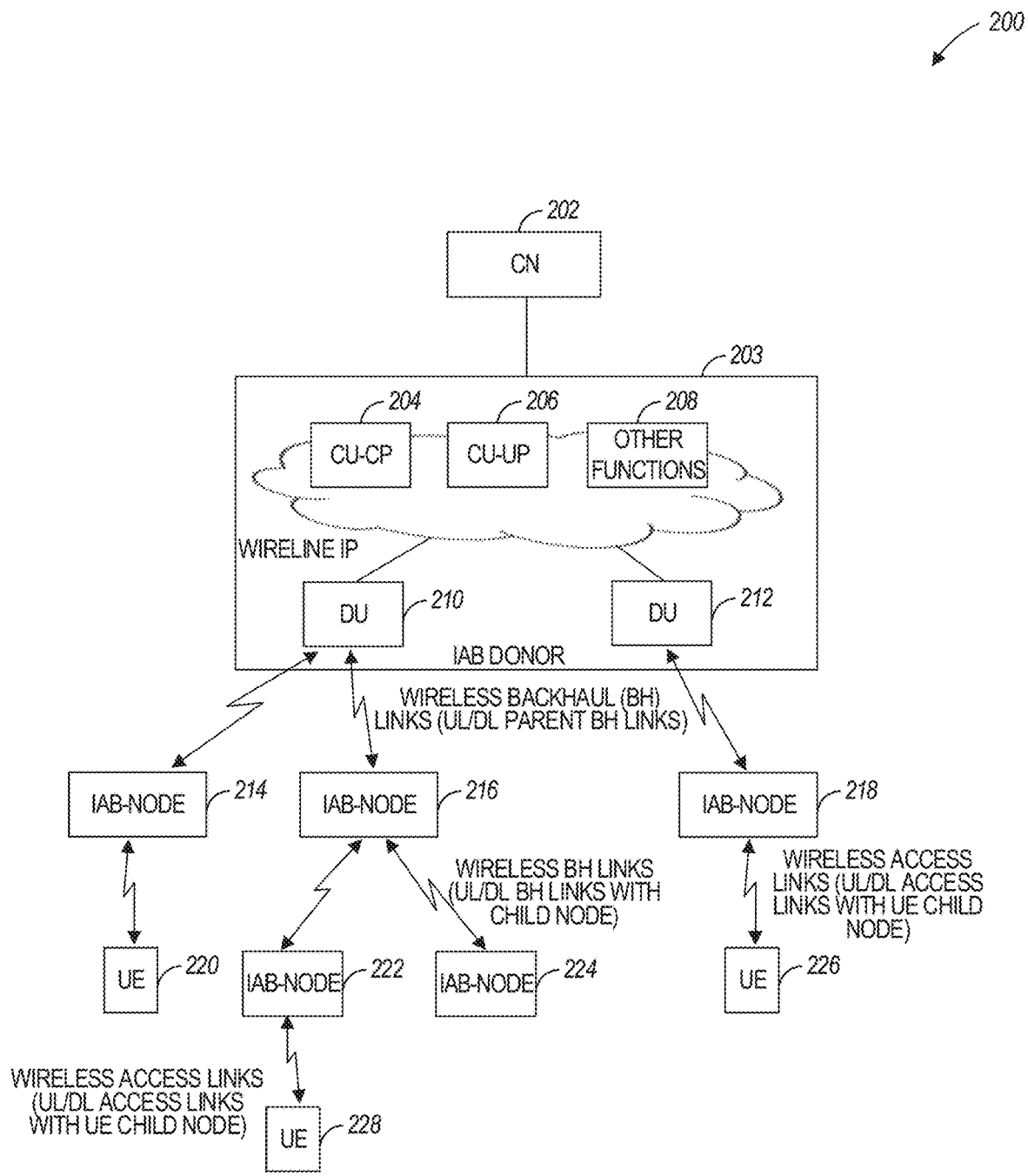
FIG. 2 illustrates a reference diagram of an IAB architecture, in accordance with some aspects.
Figure 3:
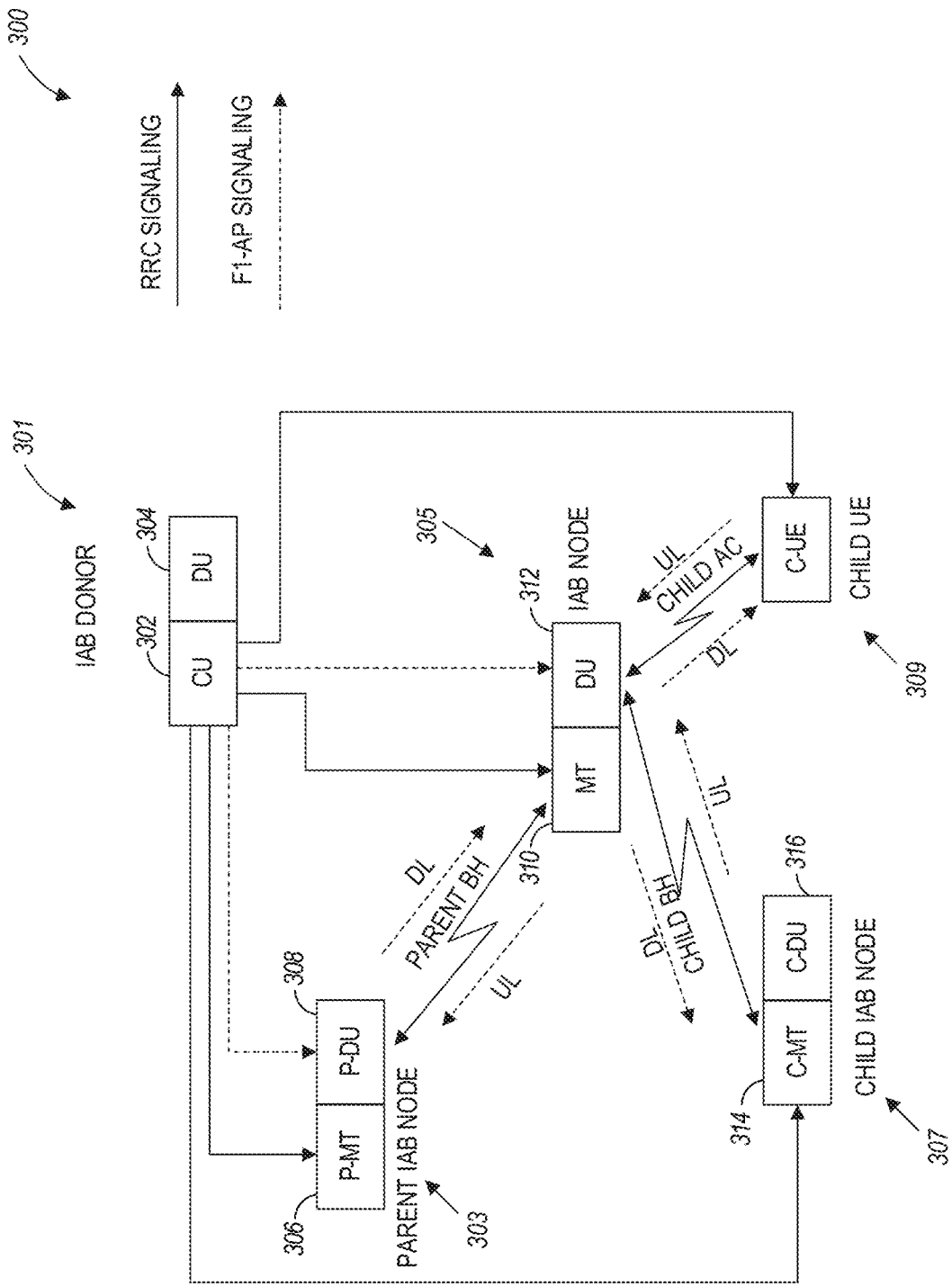
FIG. 3 illustrates a central unit (CU)-distributed unit (DU) split and signaling in an IAB architecture, in accordance with some aspects.

As illustrated in FIGS. 2-3, in an IAB network, an IAB node can connect to its parent node (an IAB donor or another IAB node) through a parent backhaul (BH) link, connect to a child user equipment (UE) through a child access (AC) link, and connect to a child IAB node through a child BH link.

FIG. 2 shows a reference diagram for IAB in a standalone mode, which contains one IAB donor node 203 and multiple IAB nodes (e.g., 214, 216, 218, 222, and 224). Referring to FIG. 2, the AB architecture 200 can include a core network (CN) 202 coupled to an IAB donor node 203. The IAB donor node 203 can include control unit control plane (CU-CP) function 204, control unit user plane (CU-UP) function 206, other functions 208, and distributed unit (DU) functions 210 and 212. The DU function 210 can be coupled via wireless backhaul links to IAB nodes 214 and 216. The DU function 212 is coupled via a wireless backhaul link to IAB node 218. IAB node 214 is coupled to a UE 220 via a wireless access link, and IAB node 216 is coupled to IAB nodes 222 and 224. The IAB node 222 is coupled to UE 228 via a wireless access link. The AB node 218 is coupled to UE 226 via a wireless access link.

Each of the IAB nodes illustrated in FIG. 2 can include a mobile termination (MT) function and a DU function. The MT function can be defined as a component of the mobile equipment and can be referred to as a function residing on an IAB-node that terminates the radio interface layers of the backhaul Uu interface toward the IAB-donor or other AB-nodes.

The IAB donor 203 is treated as a single logical node that comprises a set of functions such as gNB-DU, gNB-CU-CP 204, gNB-CU-UP 206, and potentially other functions 208. In deployment, the IAB donor 203 can be split according to these functions, which can all be either collocated or non-collocated as allowed by 3GPP NG-RAN architecture. IAB-related aspects may arise when such a split is exercised. In some aspects, some of the functions presently associated with the IAB-donor may eventually be moved outside of the donor in case it becomes evident that they do not perform IAB-specific tasks.

FIG. 3 illustrates a central unit (CU)-distributed unit (DU) split and signaling in an IAB architecture 300, in accordance with some aspects. Referring to FIG. 3, the IAB architecture 300 includes an IAB donor 301, a parent IAB node 303, an IAB node 305, a child IAB node 307, and a child UE 30). The IAB donor 301 includes a CU function 302 and a DU function 304. The parent IAB node 303 includes a parent MT (P-MT) function 306 and a parent DU (P-DU) function 308. The IAB node 305 includes an MT function 310 and a DU function 312. The child IAB node 307 includes a child MT (C-MT) function 314 and a child DU (C-DU) function 316.

As illustrated in FIG. 3. RRC signaling can be used for communication between the CU function 302 of the IAB donor 301 and the MT functions 306, 310, and 314, as well as between the CU function 302 and the child UE (C-UE) 309. Additionally, F1 access protocol (F1AP) signaling can be used for communication between the CU function 302 of the IAB donor 301 and the DU functions of the parent IAB node 303 and the IAB node 305.

As illustrated in FIGS. 2-3, multiple IAB nodes are connected to a donor node (DN) via a wireless backhaul. A DN or a parent IAB node needs to properly allocate resources for its child IAB node under the half-duplex constraint at the child IAB node. In some aspects, the time-frequency resource allocated to the parent link may be orthogonal to the time-frequency resource allocated to the child or access link.

In an IAB network, there may exist resource transition time misalignment for a co-located IAB DU/MT. In some aspects, a parent IAB node can be made aware of the number of guard symbols (Ng) the child IAB node would like the parent AB node not to use (e.g., desired Ng) at the edge (beginning or end) of a slot when there is a transition between child MT and child DU. Separately or additionally, the child AB node can be made aware of the number of guard symbols that the parent IAB node will provide (e.g., actual Ng). Disclosed techniques may use new signaling regarding IAB MT/DU resource transition guard symbols to fulfill the following two purposes: P1: Parent DU to be aware of Ng symbols that an IAB node desires ("desired Ng"); and P2: IAB node to be aware of Ng symbols that its parent DU applies ("actual Ng").

Disclosed techniques provide signaling contents, signaling mechanisms, and detailed signaling methods to fulfill these two purposes.

In some aspects, the following statements on time-domain resource allocation may be considered by the disclosed techniques:

From an MT point-of-view, the following time-domain resources can be indicated for the parent link as in NR Release-15 (D/U/F): Downlink time resource; Uplink time resource; and Flexible time resource.

From a DU point-of-view, the child link has the following types of time-domain resources (D/U/F/NA): Downlink time resource; Uplink time resource; Flexible time resource; and Not available (NA) time resources (not to be used for communication on the DU child links).

For each of the downlink, uplink, and flexible time-resource types of the DU child link, there are two flavors: hard and soft (HS). Hard: The corresponding time resource is always available for the DU child link. Soft: The availability of the corresponding time resource for the DU child link is explicitly and/or implicitly controlled by the parent node.

In some aspects, for an IAB node, the co-located IAB DU and IAB MT functions have separate semi-static resource configuration from the CU function of the IAB donor node. In addition, the parent DU will conduct dynamical resource scheduling for the IAB MT, while the co-located IAB DU will conduct dynamic resource scheduling for the child links. Several factors may cause potential resource transition time misalignment for the co-located IAB DU/MT: transmission propagation delay for the IAB MT to receive from the parent DU (MT Rx) time advance (TA) is introduced for the IAB MT to transmit to the parent DU (MT Tx): and there exists switching time among any transition among DU Tx. DU Rx, MT Tx, and MT Rx.

In some aspects, in one IAB node, the co-located DU and MT functions may have assigned resource transition in the adjacent slots for the DU and MT to transmit (Tx) or receive (Rx). For example, if a resource is assigned for the IAB MT at slot n and a resource is assigned for the co-located IAB DU at slot n+1, the following four resource transition cases may apply:

Case A1: MT Rx at slot n->DU Tx at slot n+1;
Case A2: MT Rx at slot n->DU Rx at slot n+1;
Case A3: MT Tx at slot n->DU Tx at slot n+1; and
Case A4: MT Tx at slot n->DU Rx at slot n+1.

In the meantime, if a resource is assigned for the IAB DU at slot n and a resource is assigned for the co-located IAB MT at slot n+1, there will be the following four transition cases:

Case B1: DU Tx at slot n->MT Tx at slot n+1;
Case B2: DU Tx at slot n->MT Rx at slot n+1;
Case B3: DU Rx at slot n->MT Tx at slot n+1; and
Case B4: DU Rx at slot n->MT Rx at slot n+1.

Figure 4:
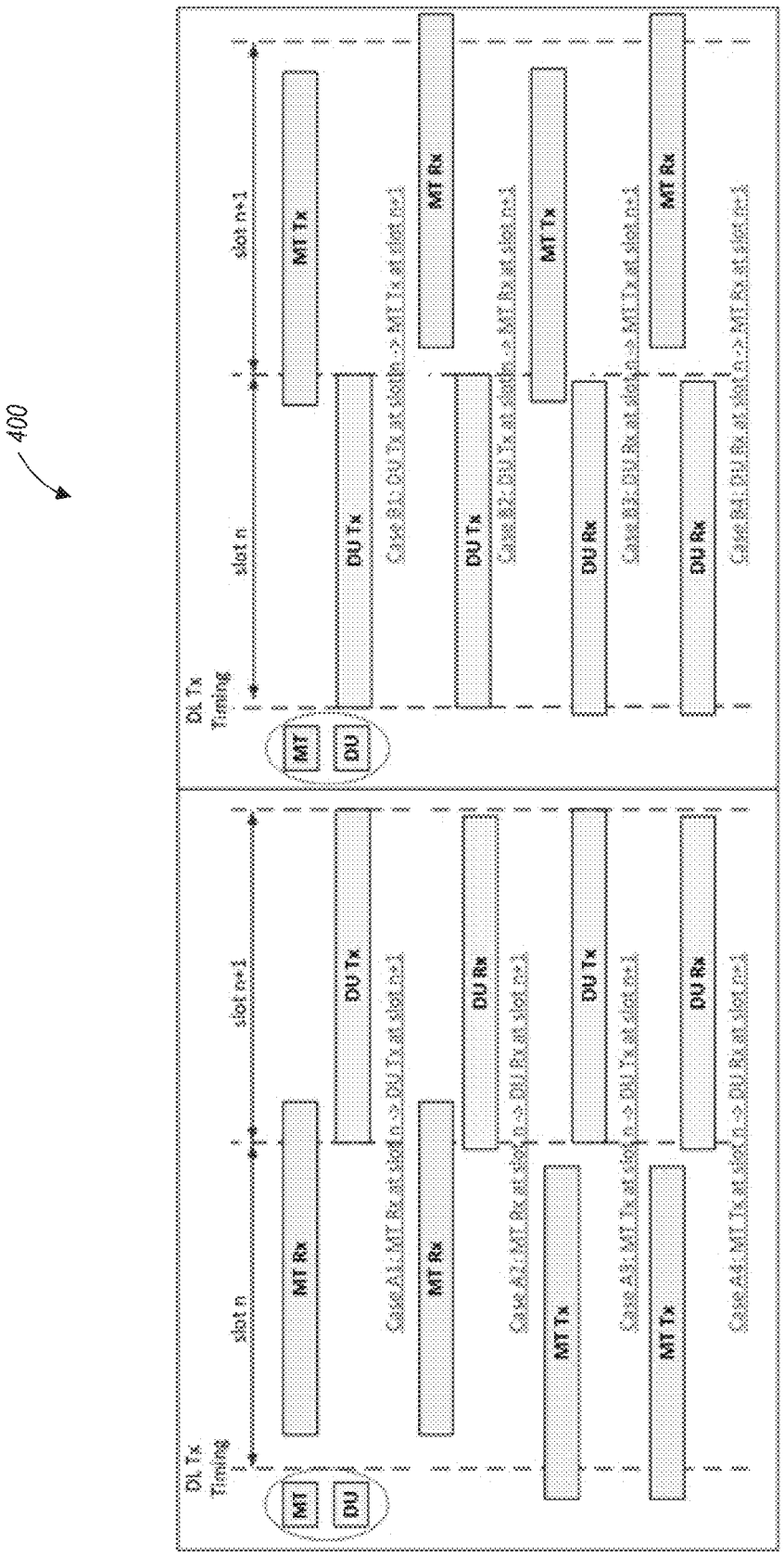
FIG. 4 illustrates example resource transitions at co-located MT/DU functions, in accordance with some aspects.

The above eight possible resource transitions are illustrated in FIG. 4. FIG. 4 illustrates diagram 400 of example resource transitions at co-located MT/DU functions, in accordance with some aspects. From FIG. 4 it may be observed that there exist overlapped resources that cause transmission/receiving conflict for co-located MT/DU functions. Hence, guard symbols (Ng) may need to be added at the edge (beginning or end) of a slot when there is a transition between co-located MT/DU.

For example, in Case A1, let $T_p$ denote the propagation delay between the parent node to the MT. $T_{MTRx\text{-}DUTx}$ denote the switching time from MT Rx to DU Tx, and $T_d$ is the OFDM symbol duration, then the number of guard symbols $N_g$ can be calculated as $$N_g = \frac{T_{MTRx\text{-}DUTx} + T_p}{T_d}.$$

This $N_g$ guard symbols can be added at the end of the MT Rx or the beginning of the DU Tx.

Example calculations of the number of guard symbols (Ng) of those eight possible resource transitions in the following Table 1.

TABLE 1

| MT/DU resource transition case | Ng Calculation | Ng range |
|---|---|---|
| Case A1: MT Rx → DU Tx | $N_g = \left\lceil \dfrac{T_{MTRx\text{-}DUTx} + T_p}{T_d} \right\rceil$ | [1,2] |
| Case A2: MT Rx → DU Rx | $N_g = \left\lceil \dfrac{T_{MTRx\text{-}DURx} + T_{DURx\text{-}DUTx} + T_p}{T_d} \right\rceil$ | [1,3] |
| Case A3: MT Tx → DU Tx | $N_g = \left\lceil \dfrac{T_{MTTx\text{-}DUTx} + T_p - TA}{T_d} \right\rceil$ | [0] |
| Case A4: MT Tx → DU Rx | $N_g = \left\lceil \dfrac{T_{MTTx\text{-}DURx} + T_{DURx\text{-}DUTx} + T_p - TA}{T_d} \right\rceil$ | [0,1] |
| Case B1: DU Tx → MT Tx | $N_g = \left\lceil \dfrac{T_{DUTx\text{-}MTTx} + TA - T_p}{T_d} \right\rceil$ | [1,3] |

TABLE 1-continued

| MT/DU resource transition case | Ng Calculation | Ng range |
|---|---|---|
| Case B2: DU Tx → MT Rx | $N_g = \left\lceil \dfrac{T_{DUTx-MTRx} - T_p}{T_d} \right\rceil$ | [0,1] |
| Case B3: DU Rx → MT Tx | $N_g = \left\lceil \dfrac{T_{DURx-MTTx} - T_{DURx-DUTx} + TA - T_p}{T_d} \right\rceil$ | [1,2] |
| Case B4: DU Rx → MT Rx | $N_g = \left\lceil \dfrac{T_{DURx-MTRx} - T_{DURx-DUTx} - T_p}{T_d} \right\rceil$ | [0] |

In some aspects, the following functionalities may also be used in connection with disclosed techniques. A parent IAB node can be made aware of the number of symbols Ng the child IAB node would like the parent IAB node not to use at the edge (beginning or end) of a slot when there is a transition between child MT and child DU. Separately or additionally, the child IAB node can be made aware of the number of guard symbols that the parent IAB node will provide.

In some aspects, one or more guard symbols Ng can be provided for each of the 181 possible transitions with potential overlap as illustrated in the following Table 2:

TABLE 2

| MT to DU | DL Tx | UL Rx |
|---|---|---|
| DL Rx UL Tx | | |
| DU to MT | DL Rx | UL Tx |
| DL Tx UL Rx | | |

In some aspects, if Ng is not provided, it is assumed to be 0.

Disclosed techniques relate to new signaling regarding IAB MT/DU resource transition guard symbols is needed to fulfill the following two purposes: P1: Parent DU to be aware of Ng symbols that an IAB node desires ("desired Ng"); and P2: IAB node to be aware of Ng symbols that its parent DU applies ("actual Ng").

Signaling Contents Regarding IAB MT/DU Resource Transition Guard Symbols

In some aspects, the signaling contents regarding the desired guard symbols to the parent IAB node (P1) or the actual guard symbols (P2) to the IAB node can have the following three options:

Option Contents-A: One integer Ng number with a range like {0,1,2,3} to indicate the maximum Ng symbols for all possible transitions.

Option Contents-B: Enumerate eight integer Ng for all eight possible transitions.

Option Contents-C: Enumerate partial integer Ng among eight possible transitions.

For example, six integers Ng may be enumerated for six possible transitions and exclude Case A3: MT Tx->DU Tx and Case B4: DU Rx->MT Rx since those two cases have Ng as 0. In another example, four integer Ng may be enumerated for four possible transitions, and exclude Case A3: MT Tx->DU Tx, Case A4: MT Tx->DU Rx, Case B2: DU Tx->MT Rx, and Case B4: DU Rx->MT Rx since those four cases have minimum Ng.

Signaling Methods for P1: Parent DU to be Aware of Ng Symbols that an IAB Node Desires (Desired Ng)

Figure 5:
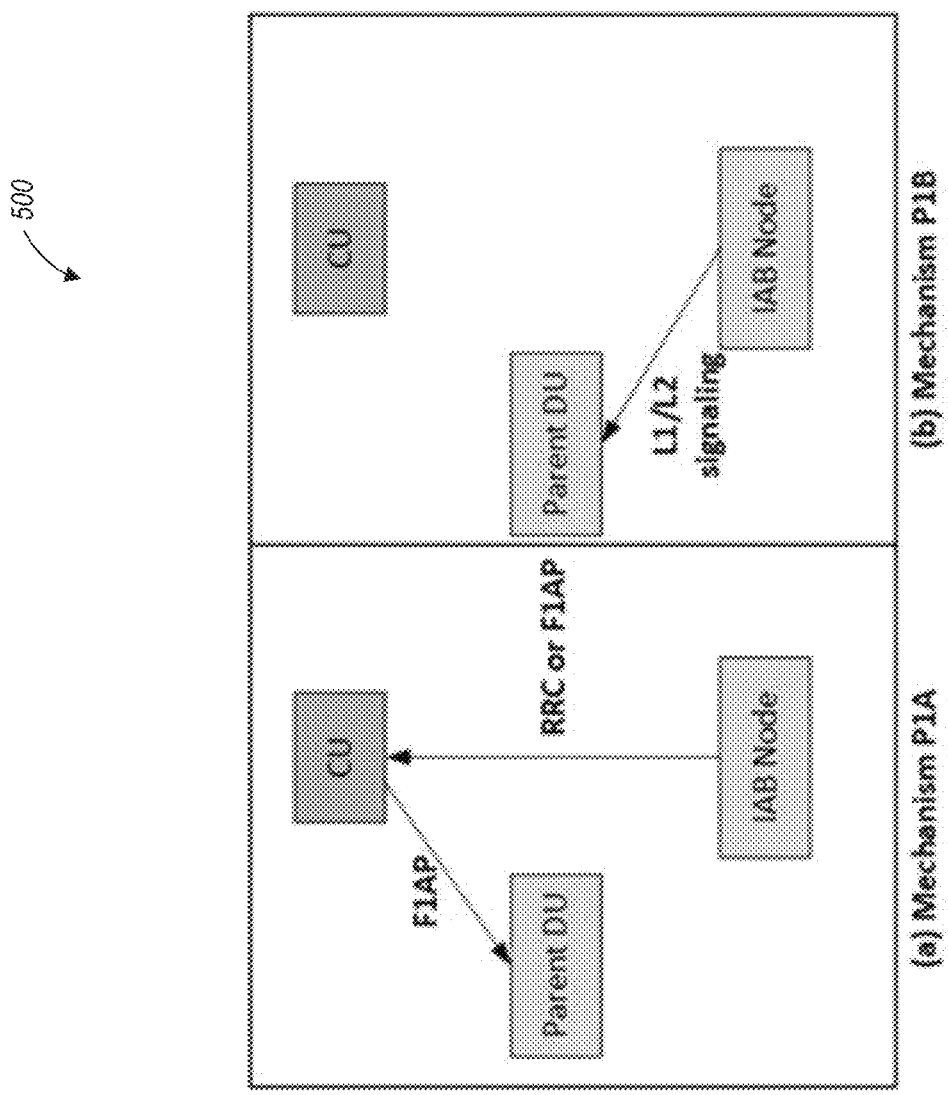
FIG. 5 illustrates different techniques for P1 signaling of desired guard symbols, in accordance with some aspects.

FIG. 5 illustrates diagram 500 of different techniques for P1 signaling of desired guard symbols, in accordance with some aspects.

In P1, as an AB node needs to inform the parent DU regarding the Ng symbols that the IAB node desires (desired Ng), different reporting mechanisms as shown in FIG. 5 may be used.

Mechanism P A: the IAB node will first inform the CU through RRC or F1AP signaling, then the CU will further inform parent DU through F1AP signaling (a semi-static mechanism).

Mechanism P1B: the IAB node will inform directly to the parent DU through L1/L2 signaling (a dynamic mechanism).

The P1 signaling methods are further discussed in the following subsections.

Signaling Methods for Mechanism P1 a (Semi-Static Mechanism for P1)

For the "desired Ng" symbols in Mechanism P1A, an IAB node will first inform the CU through RRC or F1AP signaling, then the CU will further inform parent DU through F1AP signaling (a semi-static mechanism). There are three types of new signaling: RRC from IAB MT to the CU; F1AP from IAB DU to the CU; and F1AP from the CU to the parent DU.

Method P1A-1: RRC Signaling from an IAB MT to the CU.

In this signaling method, an IAB node's desired Ng symbols information is transmitted to the donor CU from the IAB MT through RRC signaling. There can be several RRC signaling enhancement embodiment options as follows. The embodiment options can be further extended to other RRC messages (not limited to those options listed below).

Option P1A-1(a): Enhancement of existing RRC IE UECapabilityInformation.

Option P1A-1(b): Enhancement of existing RRC IE UL-DCCH-MessageType.

Option P1A-1(c): Enhancement of existing RRC IE UL-CCCH-MessageType.

Option P1A-1(d): Enhancement of existing RRC IE UL-CCCH1-MessageType.

Option P1A-1(e): Enhancement of existing RRC IE UEAssistanceInformation.

Option P1A-1(f): Introduce a new RRC message.

One embodiment of Option P1A-1(a) is as follows. An embodiment of Option P1A-1(b)-(f) can be defined in the same manner. In this embodiment, only the signaling contents Option Contents-B is applied, which is to enumerate eight integer Ng for all eight possible transitions. Other signaling contents options can be applied similarly.

In one embodiment of Option P1A-1(a), an additional field desiredNg as a sequence of eight integers (range from 0 to 3) can be added to RRC IE UECapabilityInformation as illustrated in Table 3 below. The order of the corresponding eight possible transitions can be predefined.

TABLE 3

```
UECapabilityInformation ::=            SEQUENCE {
    rrc-TransactionIdentifier          RRC-TransactionIdentifier,
    desiredNg                          SEQUENCE (SIZE (1..8))
                                           OF INTEGER (0..3)    OPTIONAL,
    criticalExtensions                 CHOICE {
        ueCapabilityInformation            UECapabilityInformation-IEs,
        criticalExtensionsFuture           SEQUENCE {}
    }
}
```
Field description:
  desiredNg
  A sequence of eight integers (range from 0-3) to indicate desired Ng for all eight possible transitions.

Method P1A-2: F1AP signaling from an IAB DU to the CU.

In this signaling method, an IAB node's desired Ng symbols information is transmitted to the donor CU from the IAB DU via F1AP signaling. There can be several F1AP protocol extension embodiment options as follows. Note that the embodiment options can be further extended to other F1AP messages (not limited to those options listed below).

Option P1A-2(a): Enhancement of existing GNB-DU RESOURCE COORDINATION RESPONSE F1AP message.

Option P1A-2(b): Enhancement of existing GNB-DU CONFIGURATION UPDATE F1AP message.

Option P1A-2(c): Enhancement of existing GNB-CU CONFIGURATION UPDATE ACKNOWLEDGE F1AP message. Option P1A-2(d): Introduction of a new dedicated F1AP message.

One embodiment of Option P1A-2(a) is as follows. An embodiment of Option P1A-2(b)-(d) can be defined in the same manner. In this embodiment, only the signaling contents Option Contents-B is applied, which is to enumerate eight integer Ng for all eight possible transitions. Other signaling contents options can be applied similarly.

The current F1AP message of GNB-DU RESOURCE COORDINATION RESPONSE is sent by a gNB-DU to a gNB-CU, to express the desired resource allocation for data traffic, as a response to the GNB-DU RESOURCE COORDINATION REQUEST (illustrated as Table 4 below) and can include the IAB node's desired Ng information to its parent DU.

Method P1A-3: F1AP signaling from the donor CU to the parent DU.

In this signaling method, an IAB node's desired Ng symbols information is transmitted from the donor CU to the parent DU via F1AP signaling. There can be several F1AP protocol extension embodiment options as follows. The embodiment options can be further extended to other F1AP messages (not limited to those options listed below).

Option P1A-3(a): Enhancement of the existing GNB-DU RESOURCE COORDINATION REQUEST F1AP message.

Option P1A-3(b): Enhancement of the existing GNB-CU CONFIGURATION UPDATE F1AP message.

Option P1A-3(c): Introduction of a new dedicated F1AP message.

Embodiment of Option P1A-3(a)/(b)/(c) can be defined in the similar manner as embodiment of Option P1A-2(a).

Signaling Methods for Mechanism P1B (Dynamic Mechanism for P1)

In some aspects, an IAB node can indicate its desired Ng information to the parent DU directly through L1/L2 signaling from the AB MT.

Method P1B: L1/L2 signaling from the IAB MT to the parent DU.

In this signaling method, there can be several options to include the desired Ng information through L1/L2 signaling to the parent DU.

Option P1B(a): Over UCI/PUCCH.

For Option P1B(a), regarding desired Ng information over uplink control information (UCI) from the IAB MT to the parent IAB DU, either a new field is added in one of the

TABLE 4

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Request type | M | | ENUMERATED (offer, execution, . . .) | | YES | reject |
| E-UTRA - NR Cell Resource Coordination Request Container | O | | OCTET STRING | Includes the X2AP E-UTRA - NR CELL RESOURCE COORDINATION REQUEST message as defined in subclause 9.1.4.24 in TS 36.423 [9]. | YES | reject |
| IAB Node Desired Ng | O | | SEQUENCE (SIZE (1 . . . 8)) OF INTEGER (0 . . . 3) | List of eight desired Ng to its parent DU for eight resource transitions. | YES | reject | current uplink control information (UCI) formats or a new UCI format is added if a new field cannot be added in current UCI formats, and can be carried by physical uplink control channel (PUCCH). The PUCCH resource used to carry the new UCI type may be semi-statically configured or based on semi-persistent scheduling or dynamic scheduling.

Option P1B(b): Over MAC CE/PUSCH.

For Option P1B(b), the desired Ng information is over medium access control (MAC) control element (CE) carried by physical uplink shared channel (PUSCH), which can be either dynamic triggered or configured grant.

In the current NR specification TS.38.321, the logic channel ID (LCID) field which identifies the logical channel instance of the corresponding MAC service data unit (SDU) or the type of the corresponding MAC CE or padding for the uplink shared channel (UL-SCH) is described in the following Table 5. In some aspects, one of the reserved LCID (33-51) may be utilized, to transmit the desired Ng information from an IAB MT to its parent DU.

TS38.321 Table 6.2.1-2 Values of LCID for UL-SCH

TABLE 5

| Index | LCID values |
|---|---|
| 0 | CCCH of size 64 bits |
| 1-32 | Identity of the logical channel |
| 33-51 | Reserved |
| 52 | CCCH of size 48 bits |
| 53 | Recommended bit rate query |
| 54 | Multiple Entry PHR (four octet $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

Option P1B(c): Over a newly defined L1 channel.

For Option P1B(c), if an L channel will be added in the current specification, we can also transmit the IAB node's desired Ng information over this newly defined L1 channel.

Signaling Methods for P2: IAB Node to be Aware of Ng Symbols that its Parent DU Applies (Actual Ng)

Figure 6:
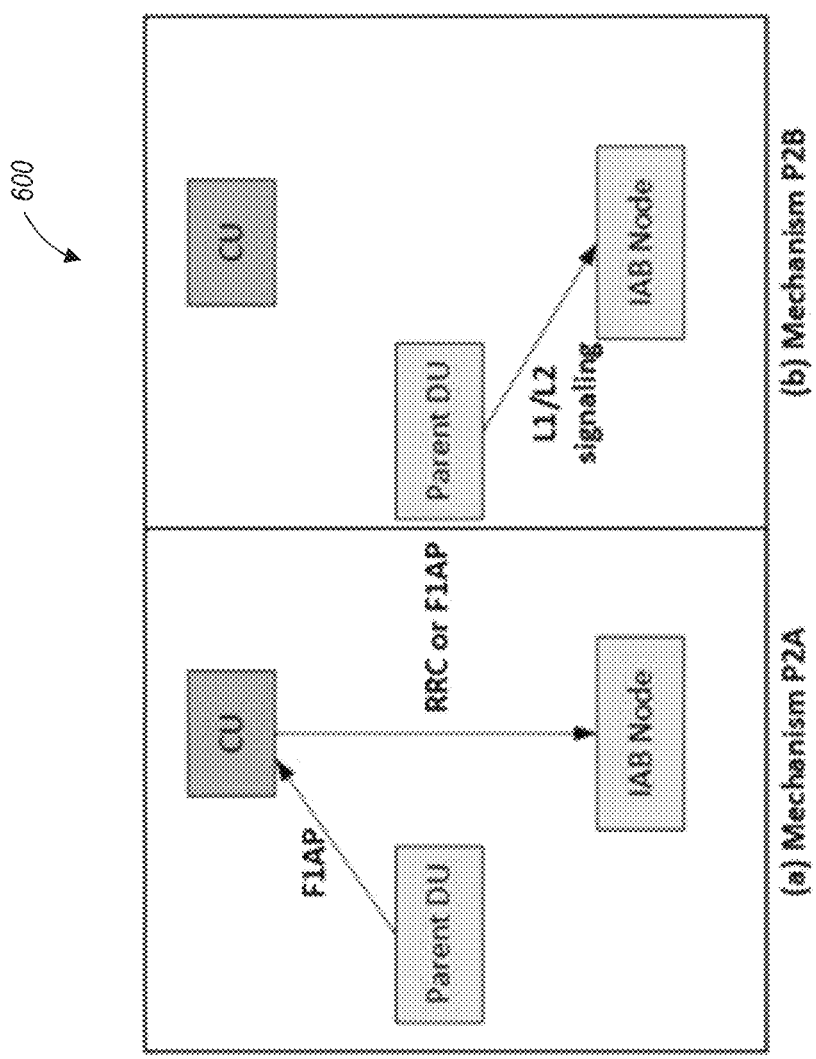
FIG. 6 illustrates different techniques for P2 signaling of actual guard symbols applied by a parent IAB node DU function, in accordance with some aspects.

FIG. 6 illustrates diagram 600 of different techniques for P2 signaling of actual guard symbols applied by a parent IAB node DU function, in accordance with some aspects.

In P2, as an IAB node needs to be informed about the Ng symbols that its parent DU applies (actual Ng), different reporting mechanisms as shown in FIG. 6 may be used.

Mechanism P2A: the IAB parent node will first inform the CU through F1AP signaling, then the CU will further inform the IAB node through RRC or F1AP signaling (a semi-static mechanism).

Mechanism P2B: the IAB parent node will inform directly to the IAB node through L1/L2 signaling (a dynamic mechanism).

Further discussion of the detailed signaling methods is provided in the following subsections.

Signaling Methods for Mechanism P2A (Semi-Static Mechanism for P2)

For the "actual Ng" symbols in Mechanism P2A, an IAB parent node will first inform the CU through F1AP signaling, then the CU will further inform the IAB node through F1AP signaling or RRC signaling (a semi-static mechanism). Three types of new signaling may be used: F1AP from the parent DU to the CU; F1AP from the CU to the IAB DU; and RRC from the CU to the IAB MT.

Method P2A-1: F1AP signaling from a parent IAB DU to the CU.

In this signaling method, an IAB node's actual Ng symbols information is transmitted to the donor CU from the IAB DU via F1AP signaling. There can be several F1AP protocol extension embodiment options as follows (the embodiment options can be further extended to other F1AP messages (not limited to those options listed below)).

Option P2A-1(a): Enhancement of existing GNB-DU RESOURCE COORDINATION RESPONSE F1AP message.

Option P2A-1(b): Enhancement of existing GNB-DU CONFIGURATION UPDATE F1AP message.

Option P2A-1(c): Enhancement of existing GNB-CU CONFIGURATION UPDATE ACKNOWLEDGE F1AP message.

Option P2A-1(d): Introduction of a new dedicated F1AP message.

One embodiment of Option P2A-1(a) is as follows. An embodiment of Option P2A-1(b)/(c)/(d) can be defined in the same manner. In one embodiment, only the signaling contents Option Contents-B is applied, which is to enumerate eight integer Ng for all eight possible transitions. Other signaling contents options can be applied similarly.

The current F1AP message of GNB-DU RESOURCE COORDINATION RESPONSE (illustrated as Table 6 below) is sent by a gNB-DU to a gNB-CU, to express the desired resource allocation for data traffic, as a response to the GNB-DU RESOURCE COORDINATION REQUEST and can include the IAB node's actual Ng information as a parent.

TABLE 6

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Request type | M | | ENUMERATED (offer, execution, . . .) | | YES | reject |
| E-UTRA - NR Cell Resource Coordination Request Container | O | | OCTET STRING | Includes the X2AP E-UTRA - NR CELL RESOURCE COORDINATION REQUEST message as defined in subclause 9.1.4.24 in TS 36.423 [9]. | YES | reject |
| IAB Node Actual Ng | O | | SEQUENCE (SIZE (1 . . . 8)) OF | List of eight actual Ng this parent DU will apply | YES | reject |

TABLE 6-continued

| IE/Group Name | Presence | Range | IE type and reference | Semantics description | Criticality | Assigned Criticality |
|---|---|---|---|---|---|---|
| | | | INTEGER (0 . . . 3) | for eight resource transitions. | | |

Method P2A-2: F1AP signaling from the donor CU to the IAB DU.

In this signaling method, a parent IAB node's actual Ng symbols information is transmitted from the donor CU to the IAB DU via F1AP signaling. There can be several F1AP protocol extension embodiment options as follows. In some aspects, the embodiment options can be further extended to other F1AP messages (not limited to those options listed below).

Option P2A-2(a): Enhancement of the existing GNB-DU RESOURCE COORDINATION REQUEST F1AP message.

Option P2A-2(b): Enhancement of the existing GNB-CU CONFIGURATION UPDATE F1AP message.

Option P2A-2(c): Introduction of a new dedicated F1AP message.

Embodiment of Option P2A-2(a)/(b)/(c) can be defined in the similar manner as embodiment of Option P2A-1(a).

Method P2A-3: RRC signaling from the CU to an IAB MT.

In this signaling method, a parent IAB node's actual Ng symbols information is transmitted from the donor CU to the IAB MT via RRC signaling. There can be several RRC signaling enhancement embodiment options as follows. The embodiment options can be further extended to other RRC messages (not limited to those options listed below).

Option P2A-3(a): Enhancement of existing RRC IE TDD-UL-DL-ConfigDedicated may be used.

Option P2A-3(b): Enhancement of existing RRC IE TDD-UL-DL-ConfigCommon may be used.

Option P2A-3(c): Enhancement of existing RRC IE ServingCellConfig may be used.

Option P2A-3(d): Enhancement of existing RRC IE ServingCellConfigCommon may be used.

Option P2A-3(e): Enhancement of existing RRC IE ServingCellConfigCommonSIB may be used.

Option P2A-3(f): Introduce a new RRC message as provided in Table 7 below.

TABLE 7

```
TDD-UL-DL-ConfigDedicated ::=   SEQUENCE {
slotSpecificConfigurationsToAddModList   SEQUENCE (SIZE
(1..maxNrofSlots)) OF
                                 TDD-UL-
DL-SlotConfig   OPTIONAL,
slotSpecificConfigurationsToreleaseList   SEQUENCE (SIZE
(1..maxNrofSlots)) OF
                                 TDD-UL-
DL-SlotIndex   OPTIONAL,
actualNg            SEQUENCE (SIZE (1..8))
                    OF INTEGER (0..3)
   OPTIONAL,
   ...
}
```

Signaling Methods for Mechanism P2B (Dynamic Mechanism for P2)

A parent DU can indicate its actual Ng information to the AB node directly via L1/L2 signaling to the IAB MT.

Method P2B: L1/L2 signaling from the parent DU to the IAB MT.

In this signaling method, there can be several options to include the actual Ng information through L1/L2 signaling from the parent DU to the IAB MT.

Option P2B(a): Over group-common PDCCH.

Regarding transmission over group-common PDCCH, a new field may be added in one of the current DCI 2_0 formats or a new DCI format may be used if a new field cannot be added in current DCI 2_0 formats.

Option P2B(b): Over MAC CE/PDSCH.

For Option P2B(b), the actual Ng information is carried over medium access control (MAC) control element (CE) carried by physical downlink shared channel (PDSCH), which can be either dynamic triggered or configured grant.

In the NR specification TS 38.321, the logic channel ID (LCID) field which identifies the logical channel instance of the corresponding MAC service data unit (SDU) or the type of the corresponding MAC CE or padding for the downlink shared channel (DL-SCH) is described in the following Table 8. In some aspects, one of the reserved LCID (33-46) may be used, to transmit the actual Ng information from the parent DU to an IAB MT.

TS38.321 Table 6.2.1-1 Values of LCID for DL-SCH

TABLE 8

| Index | LCID values |
|---|---|
| 0 | CCCH |
| 1-32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

Option P2B3(c): Over a newly defined L1 channel.

For Option P2B(c), if an L1 channel will be added in the current specification, we can also transmit the IAB parent node's actual Ng information over this newly defined L1 channel.

In some aspects, the mechanisms P1A and mechanism P1B can be applied independently or jointly. For example, only mechanism P1A or only mechanism P1B may be applied. However, in some aspects, mechanism P1A may be applied semi-statically. In some aspects, mechanism P1B may be dynamically triggered when there are some Ng changes corresponding to propagation delay change. TA change, or switching time change. In some aspects, the mechanisms P2A and mechanism P2B can be applied independently or jointly.

In some aspects, any combination from mechanism P1A/P1B, mechanism P2A/P2B can be applied. For example, mechanism P1A (semi-static desired Ng) and mechanism P2B (dynamic actual Ng) can be applied for the two purposes.

Signaling Enhancements for Per-DU and Per-Link Resource Configuration of an IAB DU An IAB DU's semi-static resource configuration will first be indicated with per-cell D/U/F resource type, and then H/S/NA attributes will be explicitly indicated per-resource type based on D/U/F in each slot. In addition, per-link DU resource configuration for NA resources should be added to the per-cell DU resource configuration. In connection with disclosed techniques, the F1AP information element (IE) "CU to DU RRC information", which includes "CellGroupConfig" RRC IE, may be enhanced to include IAB DU's semi-static per-DU and the per-link resource configuration. The detailed RRC IEs "TDD-UL-DL-ConfigCommon" and "TDD-UL-DL-ConfigDedicated" (which will merge into the RRC IE "CellGroupConfig") may be enhanced to include an IAB DU's semi-static per-DU H/S/NA configuration and per-link NA configuration.

Disclosed techniques may use per-link DU resource configuration for NA resources should be added to the per-cell DU resource configuration. Additionally, the disclosed techniques may include detailed signaling enhancements such as IAB DU's semi-static per-DU and the per-link resource configuration.

In some aspects, the following DU/MT resource configurations may be used:

From an MT point-of-view, the following time-domain resources can be indicated for the parent link as in NR Release-15 (D/U/F): downlink time resource, uplink time resource, and flexible time resource.

From a DU point-of-view, the child link has the following types of time-domain resources (D/U/F/NA): downlink time resource, uplink time resource, flexible time resource, and not available (NA) time resources (not to be used for communication on the DU child links).

For each of the downlink, uplink, and flexible time-resource types of the DU child link, there are two flavors: hard and soft (H/S). Hard: the corresponding time resource is always available for the DU child link. Soft: the availability of the corresponding time resource for the DU child link is explicitly and/or implicitly controlled by the parent node.

In addition, the following DU semi-static resource configurations may be used:

The resources are configured on a per DU (cell) basis. FFS: indication of additional supplemental per-link resource configurations of child DUs.

Indication of D/U/F resources in the semi-static DU resource configuration includes the following. The flexibility to configure all of the slot patterns and formats supported by the existing Rel-15 TDD-UL-DL-Config RRC configurations and slot format table defined in Table 11.1.1-1 in TS38.213. FFS: additional pattern durations than supported in Rel-15. FFS: default resources or pattern.

New slot formats are defined only for IAB nodes (DU and MTs) which begin with uplink slots, uplink symbols, or flexible symbols. Usage of these slot formats should be compatible with Rel-15 access UEs sharing the same link. FFS: whether these slot formats also need to be included in the MT RRC configuration and/or SFI carried on DCI Format 2_0. H/S/NA attributes for the per-cell DU resource configuration are explicitly indicated per-resource type (D/U/F) in each slot.

In some aspects, an IAB DU's semi-static resource configuration will first be indicated with per-cell D/U/F resource type, and then H/S/NA attributes will be explicitly indicated per-resource type based on D/U/F in each slot.

In some aspects, per-link DU configuration can be more flexible and beneficial in addition to the per-DU configuration. For example, per-link based not available (NA) configuration at an IAB DU can tailor the resource allocation for one child link for interference management or multi-parent child node's link selection. Hence, per-link DU resource configuration for NA resources may be added to the per-cell DU resource configuration.

Signaling Enhancements for Per-DU and Per-Link Resource Configuration of an IAB DU For IAB CU-DU split architecture, F1AP signaling defines the messages between CU and an IAB DU. An IAB DU's semi-static resource configuration (per-DU and per-link) can be fulfilled through enhancements on current F1AP signaling.

In one embodiment, the F1AP IE "CU to DU RRC information", which includes "CellGroupConfig" RRC IE and can be enhanced to include IAB DU's semi-static per-DU and per-link resource configuration as in the following Table 9. This F1AP IE "CU to DU RRC information" is included in the F1AP message "UE CONTEXT SETUP REQUEST" and/or F1AP message "UE CONTEXT MODIFICATION REQUEST".

TABLE 9

| IE/Group Name | Presence | Range | IE type and reference | Semantics description | Criticality | Assigned Criticality |
|---|---|---|---|---|---|---|
| CG-ConfigInfo | O | | OCTET STRING | CG-ConfigInfo, as defined in TS 38.331 [8]. | — | |
| UE-CapabilityRAT-ContainerList | O | | OCTET STRING | This IE is used in the NG-RAN and it consists of the UE-CapabilityRAT-ContainerList, as defined in TS 38.331 [8]. | — | |
| MeasConfig | O | | OCTET STRING | MeasConfig, as defined in TS 38.331 [8] (without MeasGapConfig). For EN-DC/NGEN-DC operation, includes | | |

TABLE 9-continued

| IE/Group Name | Presence | Range | IE type and reference | Semantics description | Criticality | Assigned Criticality |
|---|---|---|---|---|---|---|
| | | | | the list of FR2 frequencies for which the gNB-CU requests the gNB-DU to generate gaps. For NG-RAN, NE-DC and MN for NR-NR DC includes the list of FR1 and/or FR2 frequencies for which the gNB-CU requests the gNB-DU to generate gaps and the gap type (per-UE or per-FR). | | |
| Handover Preparation Information | O | | OCTET STRING | HandoverPreparationInformation, as defined in TS 38.331 [8]. | YES | ignore |
| CellGroupConfig | O | | OCTET STRING | CellGroupConfig, as defined in TS 38.331 [8] and enhanced to include IAB DU's semi-static per-DU and per-link resource configuration | YES | ignore |
| Measurement Timing Configuration | O | | OCTET STRING | Contains the MeasurementTimingConfiguration internode message defined in TS 38.331 [8]. In EN-DC/NGEN-DC, it is included when the gaps for FR2 are requested to be configured by the MeNB. For MN in NR-NR DC, it is included when the gaps for FR2 and/or FR1 are requested by the SgNB | YES | ignore |
| UEAssistanceInformation | O | | OCTET STRING | UEAssistanceInformation, as defined in TS 38.331 [8]. | YES | ignore |
| CG-Config | O | | OCTET STRING | CG-Config, as defined in TS 38.331 [8]. | YES | ignore |

In some aspects, the RRC IEs "TDD-UL-DL-ConfigCommon" and "TDD-UL-DL-ConfigDedicated" can be further enhanced to include an IAB DU's semi-static per-DU H/S/NA configuration and per-link NA configuration. These RRC IEs may be merged into RRC IE "CellGroupConfig" and included in the F1AP IE "CU to DU RRC information".

In some aspects, a base station uses RRC field TDD-UL-DL-ConfigCommon to configure cell-specific UL/DL resource assignment and uses TDD-UL-DL-ConfigDedicated to configure UE-specific UL/DL resource assignment. Both cell-specific and UE-specific semi-static configuration follows the same UL/DL pattern: DL-F-UL, which is demonstrated in FIG. 7.

Figure 7:
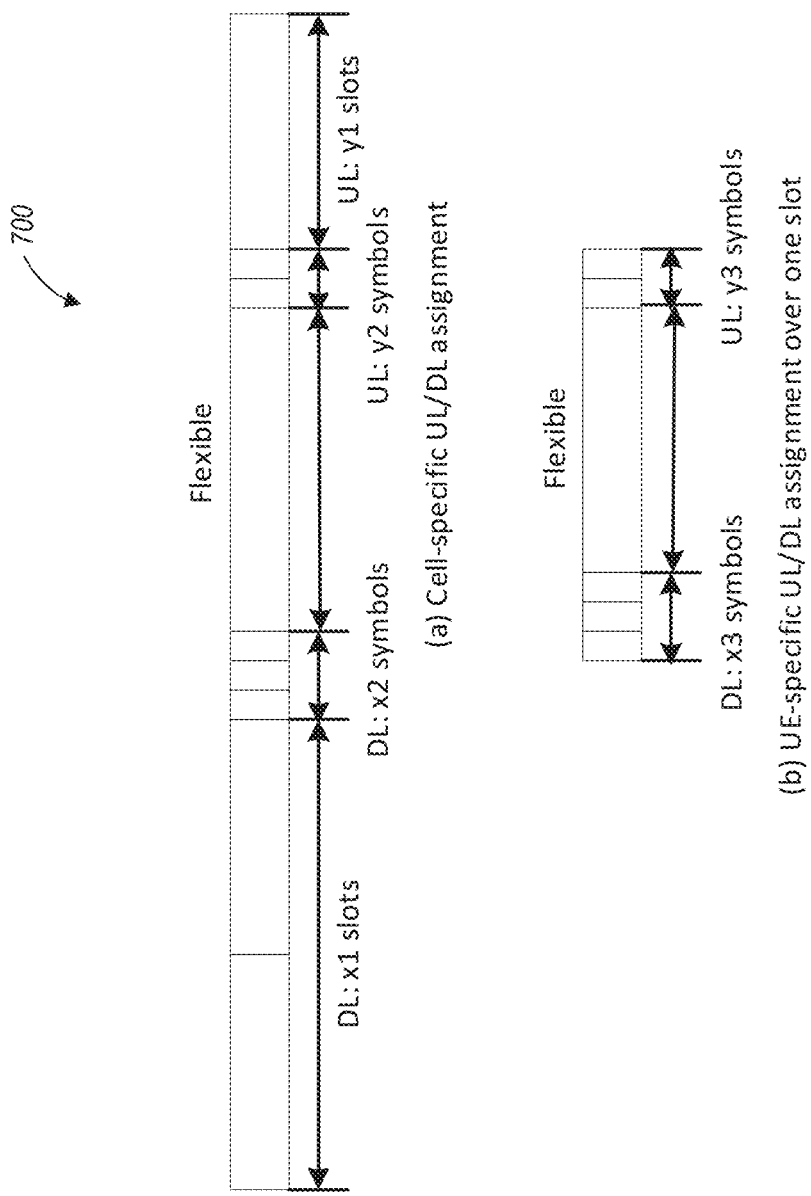
FIG. 7 illustrates cell-specific uplink (UL)/downlink (DL) assignment and UE-specific UL/DL assignment, in accordance with some aspects.

FIG. 7 illustrates cell-specific uplink (UL)/downlink (DL) assignment and UE-specific UL/DL assignment, in accordance with some aspects.

In some aspects, to accommodate an IAB DU's semi-static per-DU resource configuration, in one embodiment, the RRC IE "TDD-UL-DL-Pattern" is enhanced as shown in Table 10 (which is used in RRC IE "TDD-UL-DL-ConfigCommon" and is merged into RRC IE "CellGroupConfig") with the following fields:

beginningtype: to indicate whether this pattern begins with DL or UL. If it begins with DL, it will have DL-F-UL pattern; if it begins with UL, it will have UL-F-DL pattern. This is because in IAB DU and MT, new slot formats that begin with uplink slots, uplink symbols are allowed;

downlinkAttribute: to indicate H/S/NA attribute to the downlink resource type for an IAB DU;

flexibleAttribute: to indicate H/S/NA attribute to the flexible resource type for an IAB DU; and uplinkAttribute: to indicate H/S/NA attribute to the uplink resource type for an IAB DU.

TABLE 10

```
TDD-UL-DL-ConfigCommon ::=            SEQUENCE {
    referenceSubcarrierSpacing            SubcarrierSpacing,
    pattern1                              TDD-UL-DL-Pattern,
    pattern2                              TDD-UL-DL-Pattern        OPTIONAL,
    ...
}
TDD-UL-DL-Pattern ::=                  SEQUENCE {
    dl-UL-TransmissionPeriodicity         ENUMERATED {ms0p5, ms0p625, ms1,
ms1p25, ms2, ms2p5,
                                                      ms5, ms10},
    beginningtype                         ENUMERATED {DL,UL}
    nrofDownlinkSlots                     INTEGER (0..maxNrofSlots),
    nrofDownlinkSymbols                   INTEGER (0..maxNrofSymbols-1),
    nrofUplinkSlots                       INTEGER (0..maxNrofSlots),
        nrofUplinkSymbols                 INTEGER (0..maxNrofSymbols-1),
        downlinkAttribute                 ENUMERATED {Hard,Soft,Not Available}
        flexbileAttribute                 ENUMERATED {Hard,Soft,Not Available}
        softAttribute                     ENUMERATED {Hard,Soft,Not Available}
```

TABLE 10-continued

```
...,
[[
    dl-UL-TransmissionPeriodicity-v1530  ENUMERATED {ms3, ms4}
OPTIONAL
    ]]
}
Field description:
  beginningtype
  To indicate whether this pattern begins with DL or UL. If it begins with DL, it will
  have DL-F-UL pattern; if it begins with UL, it will have UL-F-DL pattern.
  downlinkAttribute
  To indicate H/S/NA attribute to the downlink resource type for an IAB DU.
  flexibleAttribute
  to indicate H/S/NA attribute to the flexible resource type for an IAB DU.
  uplinkAttribute
  to indicate H/S/NA attribute to the uplink resource type for an IAB DU.
```

To accommodate an IAB DU's semi-static per-link NA resource configuration, in one embodiment, the RRC IE "TDD-UL-DL-ConfigDedicated" is enhanced as provided in Table 11 (which will merge into "RRC IE "CellGroupConfig") with the additional fields and add a new RRC IE "TDD-UL-DL-SlotConfigPerlink" as follows.

Figure 8:
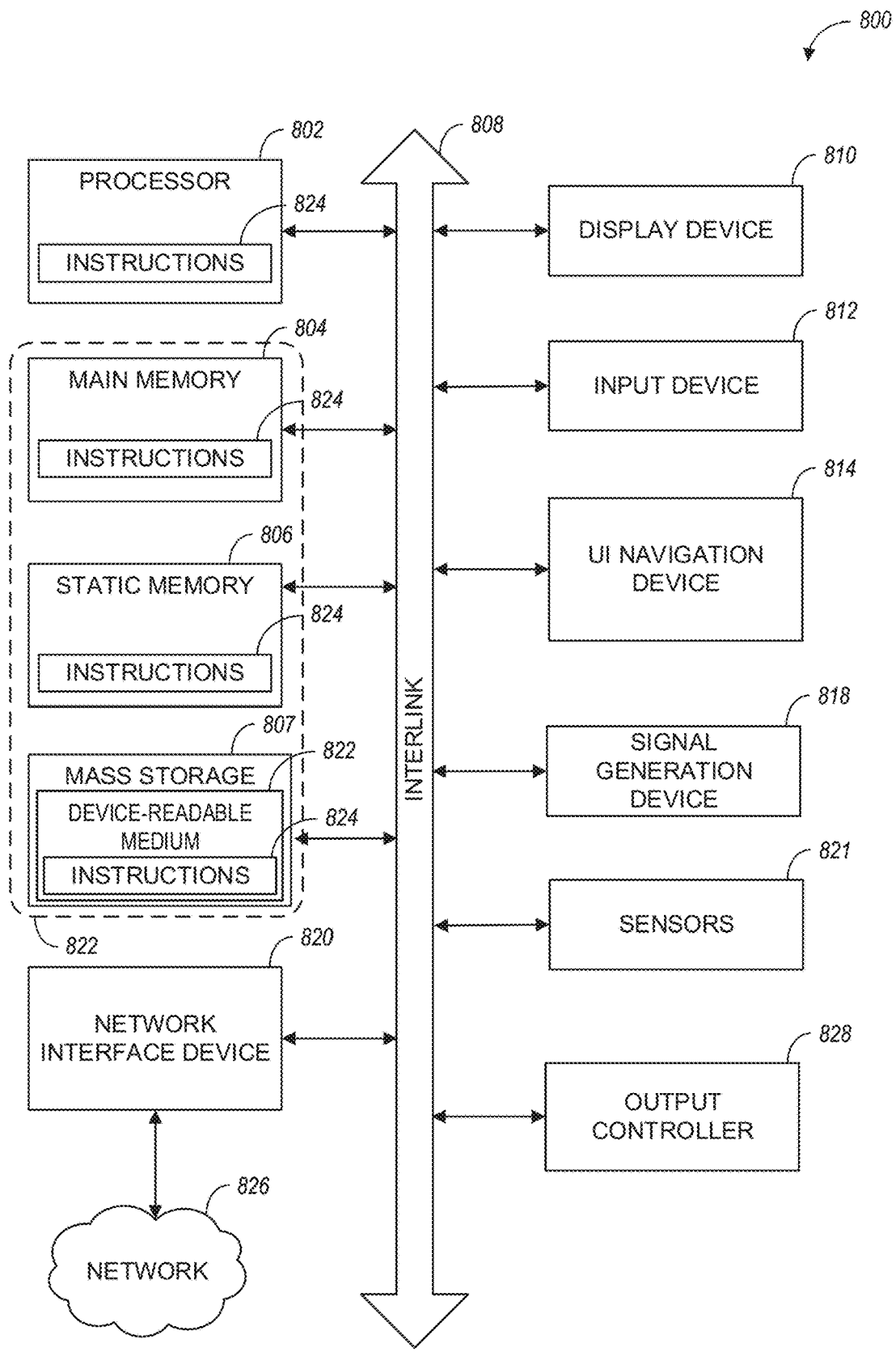
FIG. 8 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 8 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the

TABLE 11

```
TDD-UL-DL-ConfigDedicated ::=             SEQUENCE {
        slotSpecificConfigurationsToAddModList               SEQUENCE (SIZE
(1..maxNrofSlots))
                                                             OF TDD-UL-DL-SlotConfig
OPTIONAL,
        slotSpecificConfigurationsToreleaseList              SEQUENCE (SIZE
(1..maxNrofSlots))
                                                             OF TDD-UL,-DL-SlotIndex
OPTIONAL,
        slotSpecificConfigurationsPerlinkToAddModList            SEQUENCE (SIZE
( 1.. maxNrofSlots))
                                                             OF TDD-UL-DL-
SlotConfigPerlink OPTIONAL,
        slotSpecificConfigurationsPerlinkToreleaseList           SEQUENCE (SIZE
(1..maxNrofSlots))
                                                             OF TDD-UL-DL-
SlotIndexPerlink OPTIONAL,
    ...
}
TDD-UL-DL-SlotConfigPerlink ::=           SEQUENCE {
        childId                 INTEGER (0..maxNrofChild),
        slotIndex               TDD-UL-DL-SlotIndex,
    symbols                     CHOICE {
        allNA                   NULL,
        explicit                SEQUENCE {
            startingSymbol             INTEGER (1..maxNrofSymbols-1)     OPTIONAL,
            nrofNASymbols              INTEGER (1..maxNrofSymbols-1)     OPTIONAL
        }
    }
}
Field description:
  slotSpecificConfigurationsToAddModList
  The slotSpecificConfigurationsPerlinkToAddModList allows overriding UL/DL
  allocations provided in tdd-UL-DL-configurationCommon with per-link DU
  configuration.
  childId
  child's ID within one IAB DU.
  slotIndex
  Identifies a slot within a dl-UL-TransmissionPeriodicity (given in tdd-UL-DL-
  configuration Common).
  allNA
  to indicate all the symbols in this slot as NA of DU's per-link configuration.
  startingSymbol
  to indicate the beginning location of the per-link NA symbol within the slot.
  nrofNASymbols
  to indicate the number of consecutive per-link NA symbols.
``` communication device 800 may operate as a standalone device or may be connected (e.g., networked) to other communication devices.

Circuitry (e.g., processing circuitry) is a collection of circuits implemented in tangible entities of the device 800 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 800 follow.

In some aspects, the device 800 may operate as a standalone device or may be connected (e.g., networked) to other devices. In a networked deployment, the communication device 800 may operate in the capacity of a server communication device, a client communication device, or both in server-client network environments. In an example, the communication device 800 may act as a peer communication device in a peer-to-peer (P2P) (or other distributed) network environment. The communication device 800 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 800 may include a hardware processor 802 (e.g., a central processing unit (CPU), a graphics processing unit (GPU), a hardware processor core, or any combination thereof), a main memory 804, a static memory 806, and storage device 807 (e.g., hard drive, tape drive, flash storage, or other block or storage devices), some or all of which may communicate with each other via an interlink (e.g., bus) 808.

The communication device 800 may further include a display device 810, an alphanumeric input device 812 (e.g., a keyboard), and a user interface (UI) navigation device 814 (e.g., a mouse). In an example, the display device 810, input device 812, and UI navigation device 814 may be a touch-screen display. The communication device 800 may additionally include a signal generation device 818 (e.g., a speaker), a network interface device 820, and one or more sensors 821, such as a global positioning system (GPS) sensor, compass, accelerometer, or another sensor. The communication device 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 807 may include a communication device-readable medium 822, on which is stored one or more sets of data structures or instructions 824 (e.g., software) embodying or utilized by any one or more of the techniques or functions described herein. In some aspects, registers of the processor 802, the main memory 804, the static memory 806, and/or the storage device 807 may be, or include (completely or at least partially), the device-readable medium 822, on which is stored the one or more sets of data structures or instructions 824, embodying or utilized by any one or more of the techniques or functions described herein. In an example, one or any combination of the hardware processor 802, the main memory 804, the static memory 806, or the mass storage 816 may constitute the device-readable medium 822.

As used herein, the term "device-readable medium" is interchangeable with "computer-readable medium" or "machine-readable medium". While the communication device-readable medium 822 is illustrated as a single medium, the term "communication device-readable medium" may include a single medium or multiple media (e.g., a centralized or distributed database, and/or associated caches and servers) configured to store one or more instructions 824. The term "communication device-readable medium" is inclusive of the terms "machine-readable medium" or "computer-readable medium", and may include any medium that is capable of storing, encoding, or carrying instructions (e.g., instructions 824) for execution by the communication device 800 and that cause the communication device 800 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices: magnetic disks, such as internal hard disks and removable disks; magneto-optical disks: Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 824 may further be transmitted or received over a communications network 826 using a transmission medium via the network interface device 820 utilizing any one of a number of transfer protocols. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input-multiple-output (SIMO), MIMO, or multiple-input-single-output (MISO) techniques. In some examples, the network interface device 820 may wirelessly communicate using Multiple User MIMO techniques.

The term "transmission medium" shall be taken to include any intangible medium that is capable of storing, encoding, or carrying instructions for execution by the communication device 800, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for use in an Integrated Access and Backhaul (IAB) node, the apparatus comprising:
    processing circuitry, wherein to configure the IAB node for switching between operation of a co-located distributed unit (DU) function and a mobile termination (MT) function, the processing circuitry is to:
    decode a media access control (MAC) control element (CE) received by the MT function from a DU function of a parent IAB node, the MAC CE including a plurality of guard symbol fields corresponding to a plurality of switching scenarios for switching between the operation of the DU function and the MT function of the IAB node, each guard symbol field of the plurality of guard symbol fields indicating a number of guard symbols for a switching scenario of the plurality of switching scenarios for switching between the operation of the DU function and the MT function of the IAB node; and
    apply the number of guard symbols at a beginning or at an end of slots for the switching scenario of the plurality of switching scenarios during the switching between the operation of the DU function and the MT function of the IAB node; and
    memory coupled to the processing circuitry and configured to store the MAC CE.

2. The apparatus of claim 1, wherein the MAC CE includes eight guard symbol fields indicating the number of guard symbols for corresponding eight switching scenarios.

3. The apparatus of claim 2, wherein the eight switching scenarios include four switching scenarios associated with switching operation from the MT function of the IAB node to the DU function of the IAB node.

4. The apparatus of claim 2, wherein the eight switching scenarios include four switching scenarios associated with switching operation from the DU function of the IAB node to the MT function of the IAB node.

5. The apparatus of claim 1, wherein the plurality of switching scenarios comprises:
    reception of data by the MT function of the IAB node followed by transmission of other data by the DU function of the IAB node;
    reception of the data by the MT function of the IAB node followed by reception of the other data by the DU function of the IAB node;
    transmission of the data by the MT function of the IAB node followed by transmission of the other data by the DU function of the IAB node;
    transmission of the data by the MT function of the IAB node followed by reception of the other data by the DU function of the IAB node;
    transmission of the other data by the DU function of the IAB node followed by transmission of the data by the MT function of the IAB node;
    transmission of the other data by the DU function of the IAB node followed by reception of the data by the MT function of the IAB node;
    reception of the other data by the DU function of the IAB node followed by transmission of the data by the MT function of the IAB node; and
    reception of the other data by the DU function of the IAB node followed by reception of the data by the MT function of the IAB node.

6. The apparatus of claim 1, further comprising:
    transceiver circuitry coupled to the processing circuitry; and
    one or more antennas coupled to the transceiver circuitry.

7. An apparatus for use in a parent Integrated Access and Backhaul (IAB) node, the apparatus comprising:
    processing circuitry, wherein to configure a child IAB node for switching between operation of a co-located distributed unit (DU) function and a mobile termination (MT) function of the child IAB node, the processing circuitry is to:

decode a media access control (MAC) control element (CE) received by a DU function of the parent IAB node (IAB-DU) from the MT function of the child IAB node, the MAC CE including a plurality of guard symbol fields corresponding to a plurality of switching scenarios for switching between the operation of the DU function and the MT function of the IAB node, each guard symbol field of the plurality of guard symbol fields indicating a number of desired guard symbols for a switching scenario of the plurality of switching scenarios for switching between the operation of the co-located DU function and the MT function of the child IAB node; and apply the number of desired guard symbols at a beginning or at an end of slots for the switching scenario of the plurality of switching scenarios associated with the switching between the operation of the co-located DU function and the MT function of the child IAB node; and memory coupled to the processing circuitry and configured to store the MAC CE.

8. The apparatus of claim 7, wherein a MAC entity on the IAB-DU is configured to reserve a sufficient number of symbols at the beginning or the end of the slots when the child IAB node switches operation from the DU function to the MT function of the child IAB node, and operation from the MT function to the DU function of the child IAB node.

9. The apparatus of claim 7, wherein the MAC CE includes eight guard symbol fields indicating the number of guard symbols for corresponding eight switching scenarios.

10. The apparatus of claim 9, wherein the eight switching scenarios include four switching scenarios associated with switching operation from the MT function of the IAB node to the DU function of the IAB node.

11. The apparatus of claim 9, wherein the eight switching scenarios include four switching scenarios associated with switching operation from the DU function of the IAB node to the MT function of the IAB node.

12. The apparatus of claim 7, wherein the number of desired guard symbols is based on a propagation delay between the DU function of the parent IAB node and the MT function of the child IAB node.

13. The apparatus of claim 12, wherein the number of desired guard symbols is further based on switching delay between transmission or reception of data on a parent backhaul link by the MT function of the child IAB node and transmission or reception of other data on a child link by the DU function of the child IAB node.

14. A non-transitory computer-readable storage medium that stores instructions for execution by one or more processors of a parent Integrated Access and Backhaul (IAB) node, the instructions to configure the IAB node for switching between operation of a co-located distributed unit (DU) function and a mobile termination (MT) function of a child IAB node within an IAB network, and to cause the parent IAB node to:

decode a media access control (MAC) control element (CE) received by a DU function of the parent IAB node (IAB-DU) from the MT function of the child IAB node, the MAC CE including a plurality of guard symbol fields corresponding to a plurality of switching scenarios for switching between the operation of the DU function and the MT function of the IAB node, each guard symbol field of the plurality of guard symbol fields indicating a number of desired guard symbols for a switching scenario of the plurality of switching scenarios for switching between the operation of the co-located DU function and the MT function of the child IAB node; and apply the number of desired guard symbols at a beginning or at an end of slots for the switching scenario of the plurality of switching scenarios associated with the switching between the operation of the co-located DU function and the MT function of the child IAB node.

15. The non-transitory computer-readable storage medium of claim 14, wherein the MAC CE includes eight guard symbol fields indicating the number of guard symbols for corresponding eight switching scenarios.

16. The non-transitory computer-readable storage medium of claim 15, wherein the eight switching scenarios include four switching scenarios associated with switching operation from the MT function of the IAB node to the DU function of the IAB node.

17. The non-transitory computer-readable storage medium of claim 15, wherein the eight switching scenarios include four switching scenarios associated with switching operation from the DU function of the IAB node to the MT function of the IAB node.

18. The non-transitory computer-readable storage medium of claim 14, wherein the plurality of switching scenarios comprises:

reception of data by the MT function of the IAB node followed by transmission of other data by the DU function of the IAB node;

reception of the data by the MT function of the IAB node followed by reception of the other data by the DU function of the IAB node;

transmission of the data by the MT function of the IAB node followed by transmission of the other data by the DU function of the IAB node;

transmission of the data by the MT function of the IAB node followed by reception of the other data by the DU function of the IAB node;

transmission of the other data by the DU function of the IAB node followed by transmission of the data by the MT function of the IAB node;

transmission of the other data by the DU function of the IAB node followed by reception of the data by the MT function of the IAB node;

reception of the other data by the DU function of the IAB node followed by transmission of the data by the MT function of the IAB node; and reception of the other data by the DU function of the IAB node followed by reception of the data by the MT function of the IAB node.

* * * * *